United States Patent
Kishida

(10) Patent No.: US 7,487,810 B2
(45) Date of Patent: Feb. 10, 2009

(54) PNEUMATIC TIRE WITH TREAD HAVING ZIGZAG SIPES

(75) Inventor: Masahiro Kishida, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 188 days.

(21) Appl. No.: 11/006,584

(22) Filed: Dec. 8, 2004

(65) Prior Publication Data

US 2005/0150581 A1 Jul. 14, 2005

(30) Foreign Application Priority Data

Jan. 9, 2004 (JP) .............................. 2004-004501

(51) Int. Cl.
*B60C 11/11* (2006.01)
*B60C 11/12* (2006.01)
(52) U.S. Cl. .............................. 152/209.21; 152/209.23; 152/DIG. 3; 152/902
(58) Field of Classification Search ............ 152/209.18, 152/209.21, 209.23, DIG. 3, 902
See application file for complete search history.

(56) References Cited

U.S. PATENT DOCUMENTS

| | | | |
|---|---|---|---|
| 4,794,965 A | 1/1989 | Lagnier | |
| 5,350,001 A * | 9/1994 | Beckmann et al. | 152/DIG. 3 |
| 5,783,002 A * | 7/1998 | Lagnier | 152/DIG. 3 |
| 5,873,399 A * | 2/1999 | Ochi et al. | 152/DIG. 3 |
| 2002/0053383 A1* | 5/2002 | Kleinhoff et al. | 152/209.18 |
| 2003/0029537 A1 | 2/2003 | Iwamura | |
| 2005/0109438 A1* | 5/2005 | Collette et al. | 152/209.18 |
| 2005/0121124 A1* | 6/2005 | Tsubono | 152/209.18 |
| 2006/0169377 A1* | 8/2006 | Hashimoto et al. | 152/DIG. 3 |

FOREIGN PATENT DOCUMENTS

| | | | |
|---|---|---|---|
| EP | 0 952 011 A | | 10/1999 |
| FR | 2 703 002 A | | 9/1994 |
| JP | 09-164815 | * | 6/1997 |
| JP | 2000177329 A1 | | 6/2000 |
| JP | 2002-321509 | * | 11/2002 |
| WO | WO-2005/030502 A1 | | 4/2005 |

* cited by examiner

*Primary Examiner*—Steven D Maki
(74) *Attorney, Agent, or Firm*—Birch, Stewart, Kolasch & Birch, LLP

(57) ABSTRACT

A pneumatic tire comprising a tread portion having tread elements each provided with a sipe, wherein the sipe is open to a upper surface of the tread element, and has an open top end including a zigzag part and a bottom, wherein the sipe comprises: a first portion in which the zigzag part of the open top end extends to a side of the bottom in a state of being inclined to one side of a longitudinal direction of the sipe; a second portion connected to an inner side in a radial direction of the first portion, and in which the zigzag part extends to the side of the bottom in a state of being inclined in an opposite direction to the first portion; and a third portion connected to an inner side in a radial direction of the second portion, and in which the zigzag part extends to the side of the bottom in a state of being inclined in an opposite direction to the second portion, and the sipe satisfies the following relation (1):

$$\alpha 1 > \alpha 2 > \alpha 3 \qquad (1)$$

where $\alpha 1$ is a ratio (a1/h1) between a displacement length a1 of the first portion and a length h1 in a radial direction of the first portion, $\alpha 2$ is a ratio (a2/h2) between a displacement length a2 of the second portion direction and a length h2 in a radial direction of the second portion, and $\alpha 3$ is a ratio (a3/h3) between a displacement length a3 of the third portion and a length h3 in a radial direction of the third portion.

14 Claims, 8 Drawing Sheets

PNEUMATIC TIRE WITH TREAD HAVING ZIGZAG SIPES

BACKGROUND OF THE INVENTION

1. Field of the Invention

The present invention relates to a pneumatic tire provided in the tread portion with sipes, more particularly to an improved shape of a sipe being capable of preventing the siping blade of a tire vulcanizing mold from bending and coming off therefrom at the time of removing the vulcanized tire from the mold.

2. Prior Art

In general, pneumatic tires such as snow tire and studless tire called "winter tire" are provided in the tread portion with a number of sipes to improve on-the-ice performance. Such performance may be improved by increasing the number of the sipes and/or the length of the sipes.

In recent years, on the other hand, in order to engage the side walls of a sipe with each other and thereby to give support to each other, the use of a sipe having three-dimensional side walls has been proposed.

In case of a sipe having three-dimensional side walls, however, when the vulcanized tire is removed from a tire mold, as the resistance becomes increased, there is a tendency for the siping blades to be deformed and come off from the mold. Further, there is a problem that a rubber is scraped from the surface of the sipe by getting out the tire from the tire mold.

SUMMARY OF THE INVENTION

It is therefore, an object of the present invention to provide a pneumatic tire with sipes, in which the resistance to removing the vulcanized tire from a tire mold is reduced and the siping blades are prevented from being deformed and coming off from the mold although the sipe has three-dimensional side walls.

According to the present invention, a pneumatic tire comprises a tread portion having tread elements each provided with a sipe, wherein the sipe is open to a upper surface of the tread element, and has an open top end including a zigzag part and a bottom in an inner side in a radial direction of the tire, wherein the sipe comprises: a first portion in which the zigzag part of the open top end extends to a side of the bottom in a state of being inclined to one side of a longitudinal direction of the sipe; a second portion connected to an inner side in a radial direction of the first portion, and in which the zigzag part extends to the side of the bottom in a state of being inclined in an opposite direction to the first portion; and a third portion connected to an inner side in a radial direction of the second portion, and in which the zigzag part extends to the side of the bottom in a state of being inclined in an opposite direction to the second portion, and the sipe satisfies the following relation (1):

$$\alpha 1 > \alpha 2 > \alpha 3 \quad (1)$$

where $\alpha 1$ is a ratio (a1/h1) between a displacement length a1 of the first portion along the longitudinal direction of the sipe and a length h1 in a radial direction of the first portion, $\alpha 2$ is a ratio (a2/h2) between a displacement length a2 of the second portion along the longitudinal direction of the sipe and a length h2 in a radial direction of the second portion, and $\alpha 3$ is a ratio (a3/h3) between a displacement length a3 of the third portion along the longitudinal direction of the sipe and a length h3 in a radial direction of the third portion.

DETAILED DESCRIPTION OF THE PREFERRED EMBODIMENTS

An embodiment of the present invention will now be described in detail in conjunction with the accompanying drawings.

Figure 1:
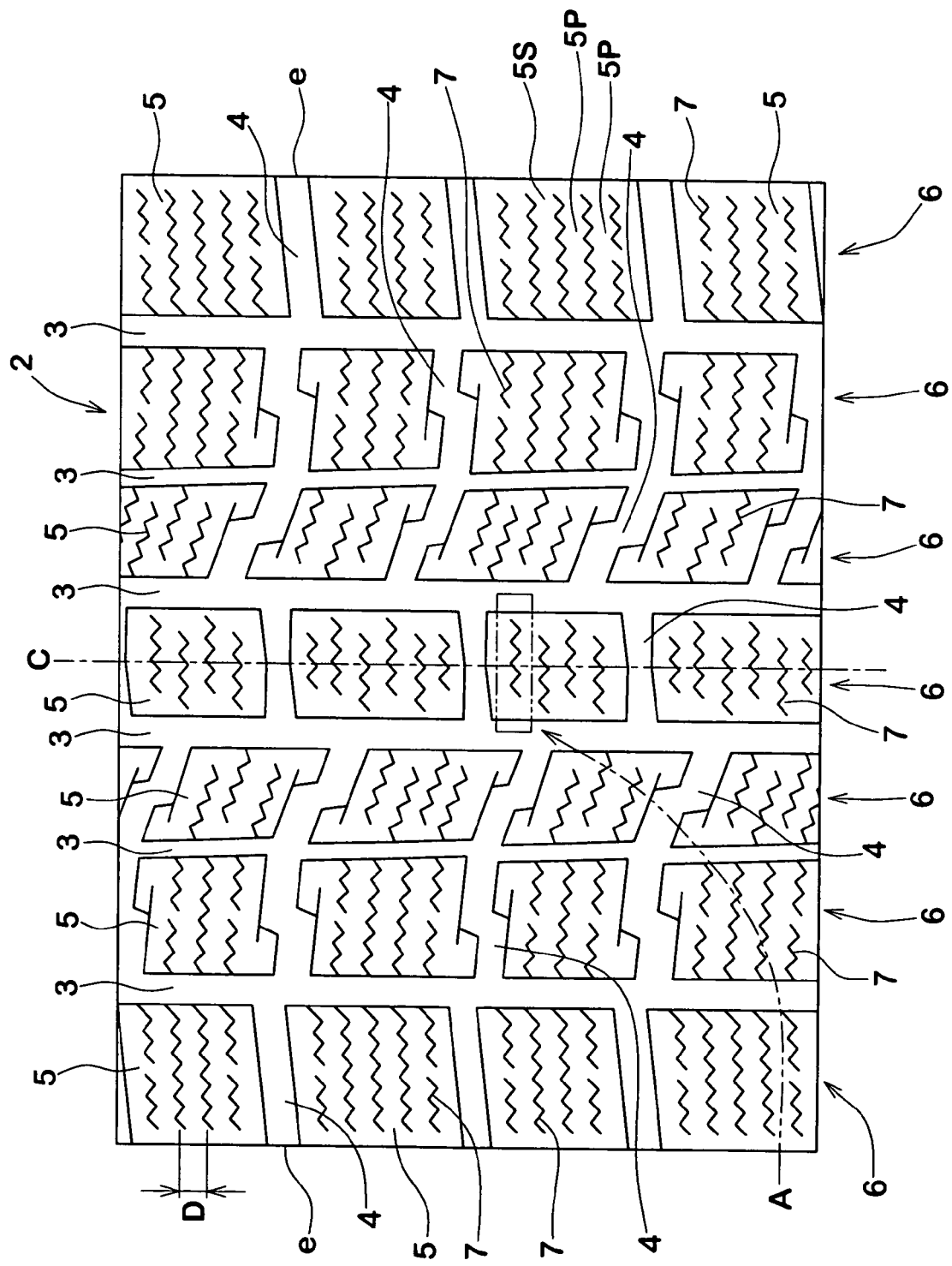
FIG. 1 is a developed view showing a tread pattern of a pneumatic tire in accordance with the present invention.

A pneumatic tire (the entire of which is not illustrated) in accordance with the present embodiment is structured such that a tread portion 2 is provided with a plurality of main grooves 3 extending in a tire circumferential direction, and sub grooves 4 extending in a direction crossing the main grooves 3. Accordingly, the tread portion 2 is divided into tread elements such as a plurality of blocks 5. The main groove 3 and the sub groove 4 are desirably structured such that a groove width is equal to or more than 3.5 mm in order to improve a wet performance. The tire in accordance with the embodiment shown in FIG. 1 is a studless tire for a passenger car.

The blocks 5 are provided with at least one, preferably a plurality of sipes 7. The sipes 7 are provided apart from each other in the tire circumferential direction. The sipe 7 in accordance with the embodiment extends approximately along a tire axial direction. Preferably, the sipe 7 extends at an angle equal to or less than 20 degree with respect to the tire axial direction. This structure allows an edge in the sipe 7 to operate effectively, and improves a driving and braking force on an icy road. Most of the adjacent sipes 7 in the tire circumferential direction is provided substantially in parallel on an upper surface 5S (a ground surface) of the block. The term "parallel" means that virtual straight lines connecting both side ends of the sipes 7 are substantially parallel.

A pitch D of the sipes 7 is not particularly limited, however, if the pitch is too small, a rigidity of the block 5 is lowered and a rubber chip or the like tends to be generated. On the contrary, if the pitch is too large, there is a tendency that a running performance on the icy road is lowered. From such a view point, the pitch D is preferably equal to or more than 2.0 mm, and more preferably equal to or more than 3.0 mm, and an upper limit thereof is preferably equal to or less than 10.0 mm, and more particularly equal to or less than 5.0 mm.

The sipe is closed by a shear force applied from the road surface at the time of running since the sipe 7 has a small width. Accordingly, the sipe is clearly differentiated from the main groove 3 and the sub groove 4 taking part in a wet performance. The width of the sipe 7 is not particularly limited, however, if the width is too large, there is a tendency that the rigidity of the block 5 is excessively lowered, and on the contrary, if it is too small, there is a tendency that productivity is lowered. From such a view point, the width Ws of the sipe 7 is preferably equal to or less than 2 mm, more preferably equal to or less than 1.5 mm, and further preferably 0.5 to 1.0 mm. The sipe 7 in accordance with the present embodiment is vulcanized by a knife blade firmly fixed to a tire vulcanizing mold.

Figure 2:
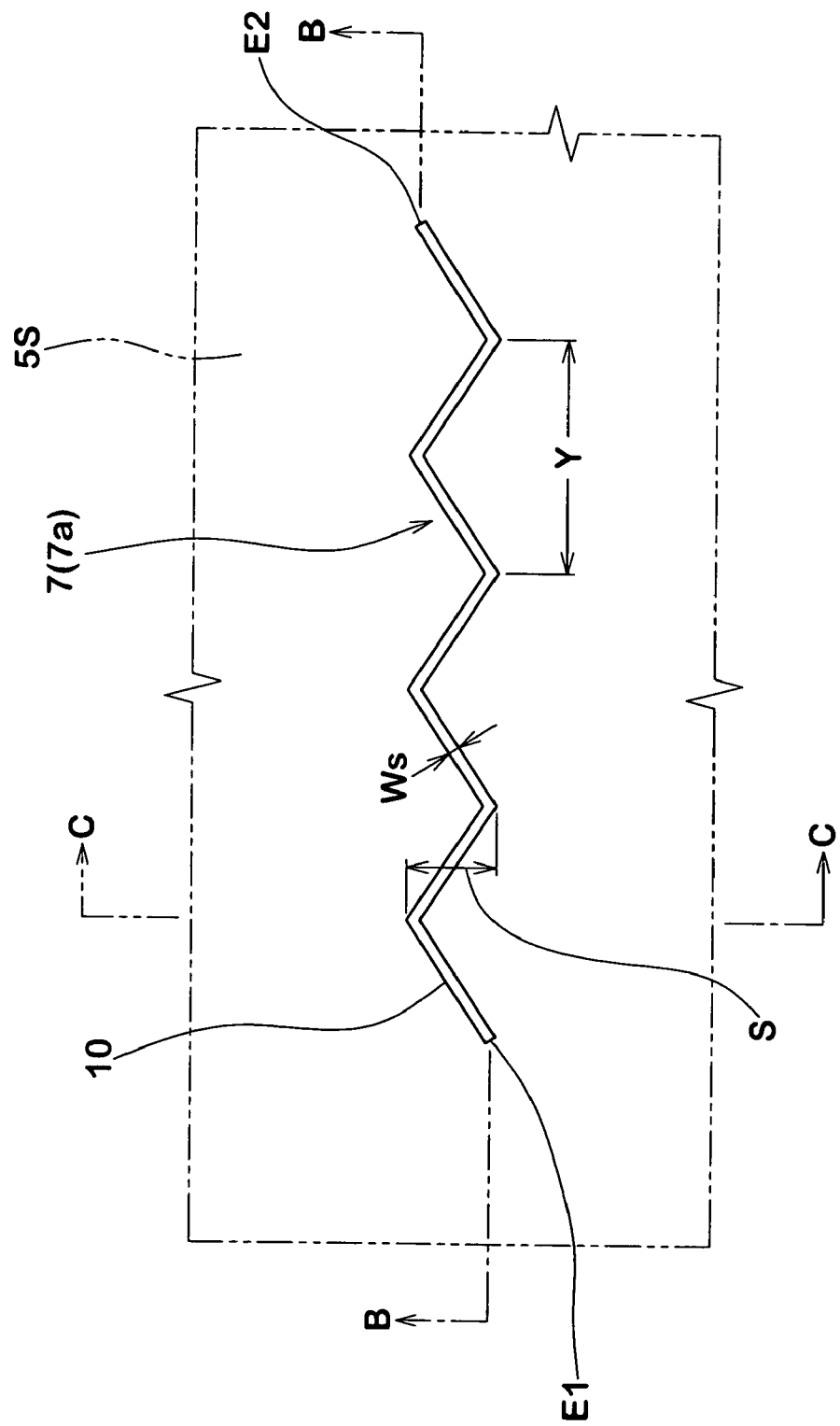
FIG. 2 is an enlarged view of a portion A in FIG. 1.
Figure 3:
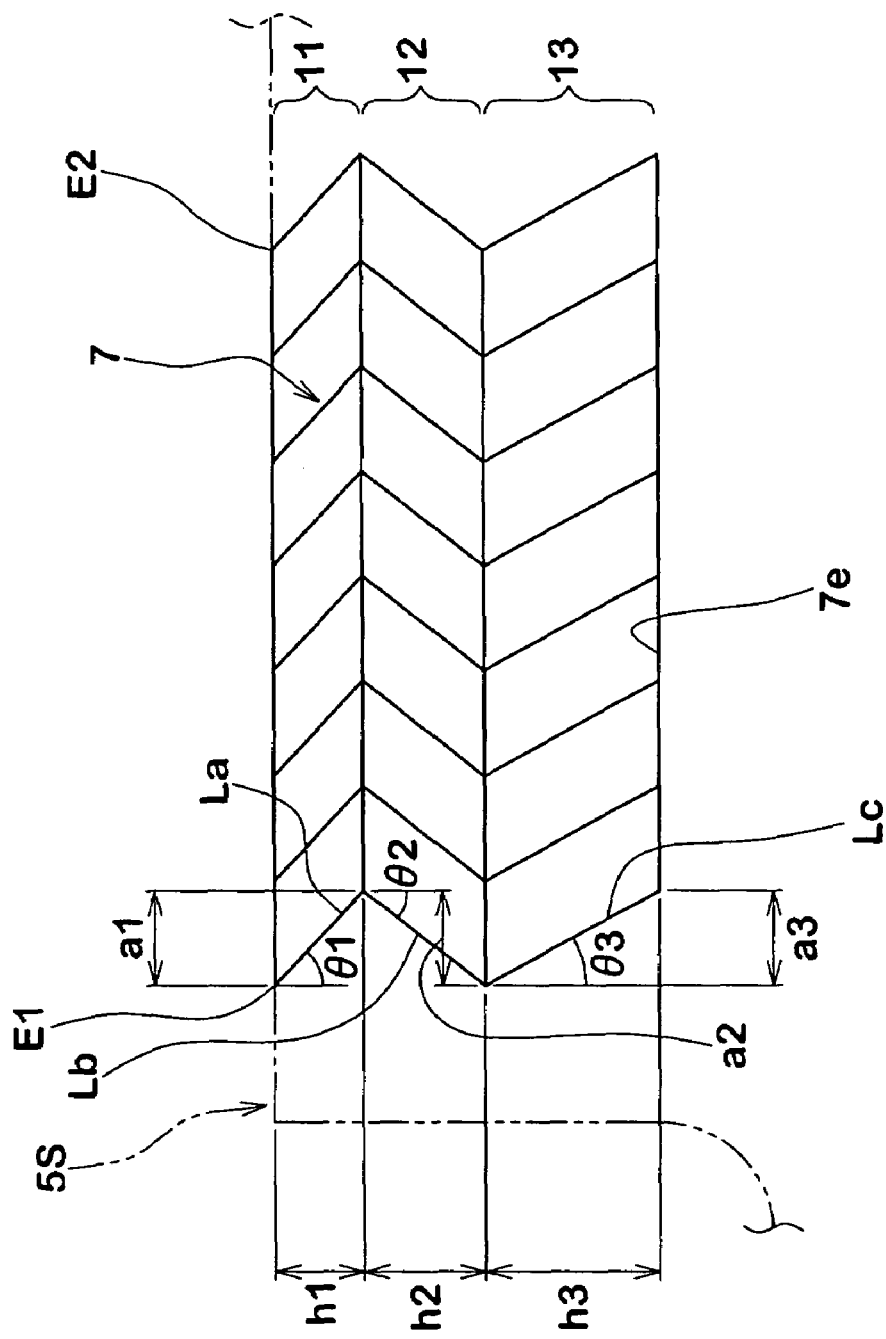
FIG. 3 is a cross sectional view along a line B-B in FIG. 2.

As shown in FIGS. 2 to 5, the sipe 7 has an open top end 10 which is open in the upper surface 5S of the block, and a bottom 7e in an inner side in a radial direction thereof. Further, the open top end 10 has one end E1 in one side and the other end E2 in the other side in a width direction of the block 5. In other words, the sipe 7 has a length extending between the one end E1 and the other end E2, and a direction thereof is called as a longitudinal direction of the sipe 7. In this case, FIG. 3 is a cross sectional view along a line B-B in FIG. 2, and a portion having no break line extends along the sipe side wall.

The sipe 7 shown in FIG. 2 is shown as a so-called closed-type sipe in which both the one end E1 and the other end E2 are not open to the main groove 3 or the tread end e. However, as drawn in FIG. 1, it may be constituted by an open-type sipe in which at least one end (or both ends) is open to the main groove 3 or the tread end e.

The open top end 10 of the sipe 7 includes a zigzag part 7a between the one end E1 and the other end E2. The sipe 7 in accordance with the present embodiment is structured only by the zigzag part 7a. However, the sipe of course includes a structure in which a portion extending linearly in a tire axial direction is provided in both ends or one end side of the zigzag part 7a.

The zigzag part 7a is structured by using a curve and/or a straight line. The curve includes, for example, a wave form obtained by connecting a plurality of circular arcs, a sine wave form and the like. Further, the zigzag part 7a includes a structure using both the straight line and the curve. In particular, a broken line zigzag shape using the straight line is preferable as in the present embodiment, and a structure obtained by chamfering a zigzag corner with a circular arc is more preferable. Further, the zigzag part 7a is desirably structured, for example, such that an amplitude S of the zigzag is 0.7 to 10.0 mm, and more preferably 0.7 to 2.0 mm. Further, the zigzag part 7a is preferably structured such that one pitch Y in a longitudinal direction is 0.6 to 10.0 times the amplitude S, and more preferably 0.6 to 2.5 times.

Figure 4:
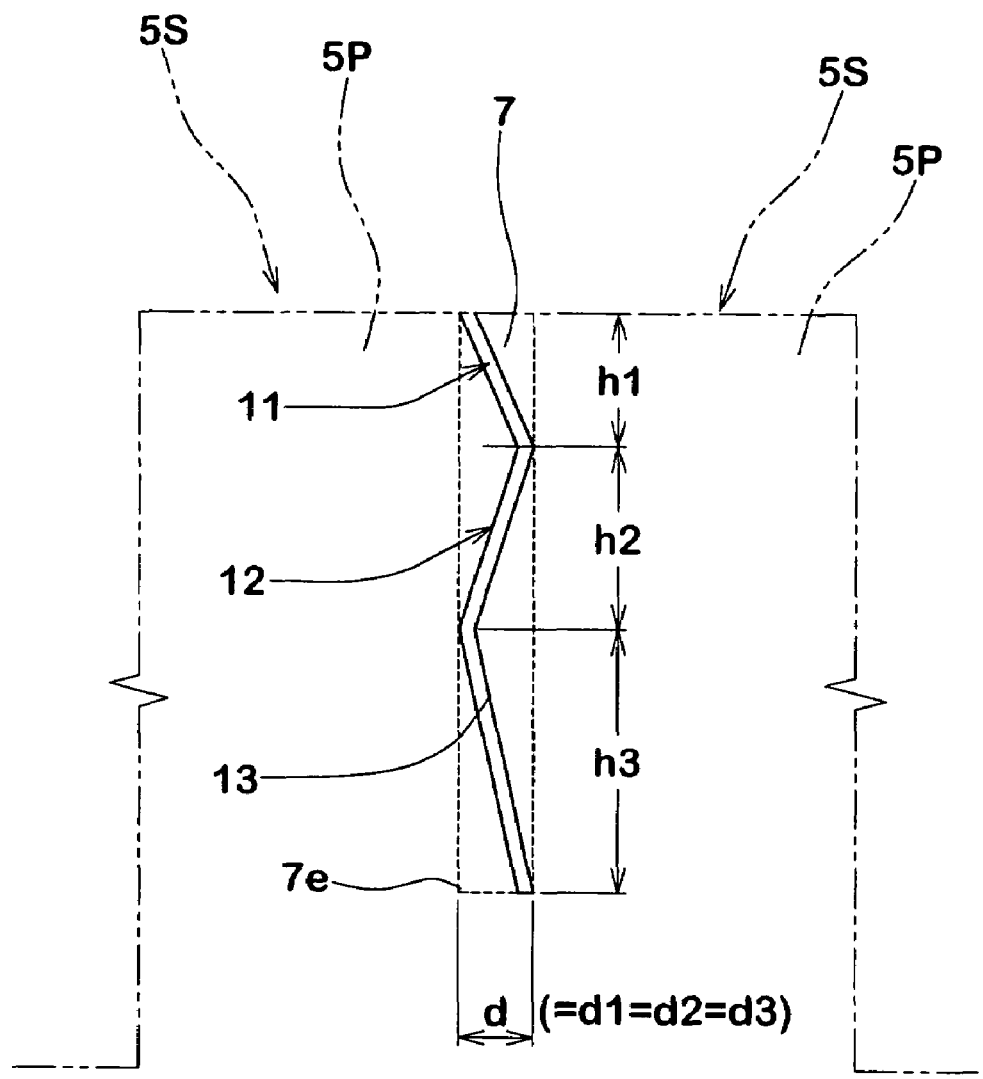
FIG. 4 is a cross sectional view along a line C-C in FIG. 2.
Figure 5:
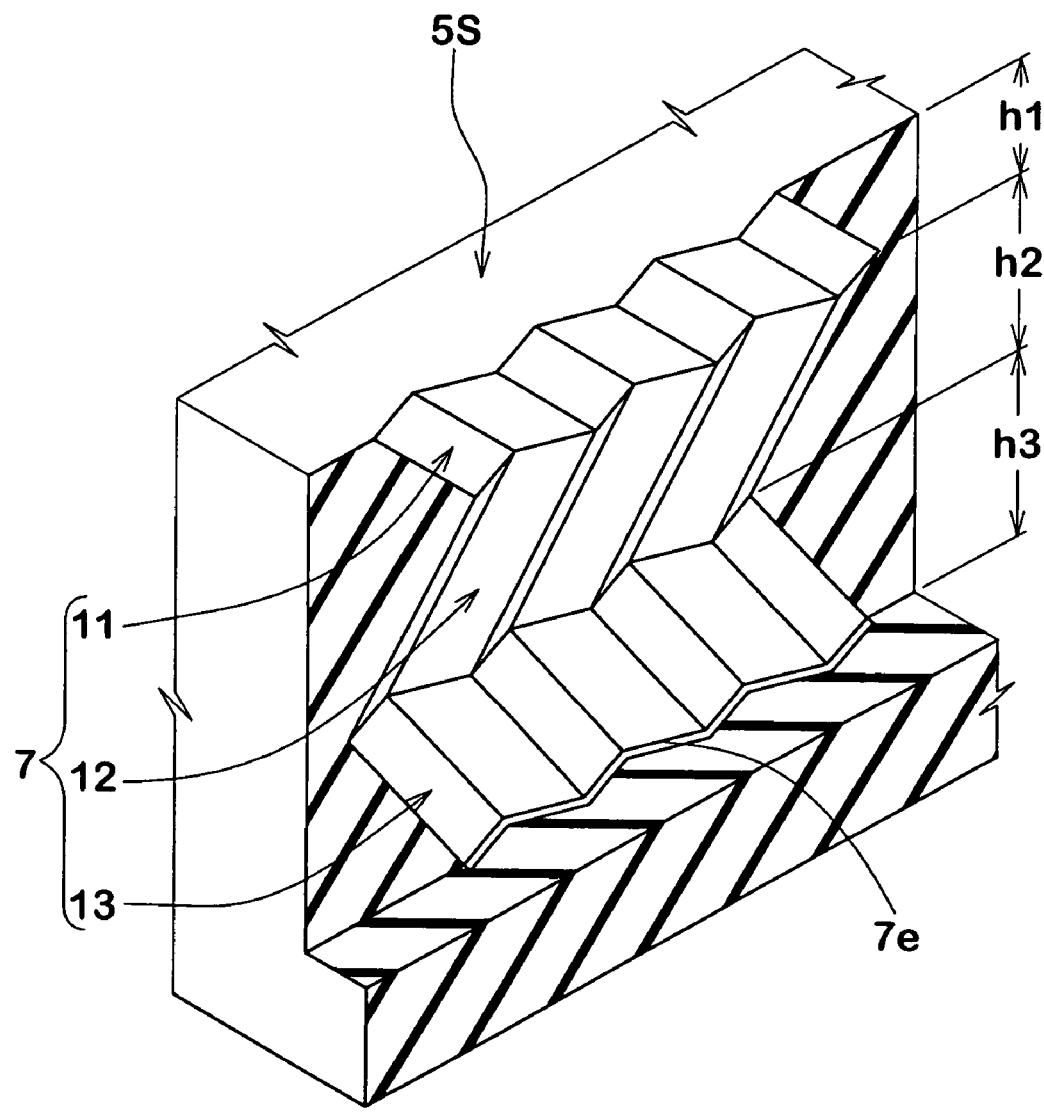
FIG. 5 is a perspective view of FIG. 3.

The sipe 7 includes a first portion 11, a second portion 12 and a third portion 13, as shown in FIGS. 3 to 5.

The first portion 11 extends to a side of the bottom 7e with being inclined (displaced) to one side (a right side in FIG. 3) in the longitudinal direction of the sipe while substantially keeping the shape of the zigzag part of the open top end 10. In FIG. 3, a displacement length along the longitudinal direction of the sipe is indicated by reference symbol "a1" in the first portion 11. Further, a length in the radial direction of the first portion 11 is indicated by reference symbol "h1".

Further, in the present specification, a ratio (a1/h1) of the displacement length a1 of the first portion 11 and the length h1 in the radial direction thereof is defined as a first displacement pitch α1. The first displacement pitch α1 expresses a degree of the slope (the displacement) of the first portion 11 with respect to the tire radial line, and is equal to a tangent of an angle θ1 (tan θ1) shown in FIG. 3. In this case, the angle θ1 is an angle between a line La drawn at a time when any one point of the zigzag part 7a of the first portion 11 is displaced (for example, a ridge line of a corner is preferable), and the tire radial line, when facing the surface of the sipe from the front (when viewing from the perpendicular direction to the longitudinal direction).

The second portion 12 is connected to an inner side in a radial direction of the first portion 11 and is extended to the side of the bottom 7e, where the zigzag part 7a is inclined to an inverse direction (a left side in FIG. 3) to the first portion 11. In other words, the second portion 12 is provided in a side of the bottom 7e rather than the first portion 11. A displacement length along the longitudinal direction of the second portion 12 is indicated by reference symbol "a2". In this embodiment, the displacement length a2 of the second portion 12 is substantially equal to the displacement length a1 of the first portion 11 (a1=a2). Further, the length in the radial direction of the second portion 12 is indicated by reference symbol "h2". In this embodiment, the length h2 is larger than the length h1 in the radial direction of the first portion 11 (h2>h1).

Further, a ratio (a2/h2) of the displacement length a2 of the second portion 12 and the length h2 in the radial direction thereof is defined as a second displacement pitch α2. The second displacement pitch α2 expresses a degree of the slope (the displacement) of the second portion 12 with respect to the tire radial line, and is equal to a tangent of an angle θ2 (tan θ2) shown in FIG. 3. In this case, the angle θ2 is an angle between a line Lb drawn at a time when any one point of the second portion 12 is displaced (for example, a ridge line of a corner is preferable), and the tire radial line, when facing the surface of the sipe from the front. In this embodiment, the second displacement pitch α2 is smaller than the first displacement pitch α1 (α1>α2) on the basis of the relation h1<h2 and a1=a2. In other words, the second portion 12 has a small degree at which the sipe is inclined in the longitudinal direction with respect to the tire radial direction, in comparison with the first portion 11.

Further, the third portion 13 is connected to an inner side in the radial direction of the second portion 12 and is extended to the side of the bottom 7e, where the zigzag part 7a is inclined to an inverse direction (a right side in FIG. 3) to the second portion 12. In other words, the third portion 13 is provided further in a side of the bottom 7e rather than the second portion 12. A displacement length along the longitudinal direction of the third portion 13 is indicated by reference symbol "a3". In this embodiment, the displacement length a3 of the third portion 13 is equal to the respective displacement lengths a1 and a2 of the first portion 11 and the second portion 12 (a1=a2=a3).

Further, the length in the radial direction of the third portion 13 is indicated by reference symbol "h3". In this embodiment, the length h3 is larger than the length h2 in the radial direction of the second portion 12 (h1<h2<h3).

Further, a ratio (a3/h3) of the displacement length a3 of the third portion 13 and the length h3 in the radial direction thereof is defined as a third displacement pitch α3. The third displacement pitch α3 expresses a degree of the slope of the third portion 13 with respect to the tire radial line, and is equal to a tangent of an angle θ3 (tan θ3) shown in FIG. 3. In this case, the angle θ3 is an angle between a line Lc drawn at a time when any one point of the third portion 13 is displaced (a ridge line of a corner is preferable), and the tire radial line, in the case of opposing to the surface of the sipe, in the same manner as the angles θ1 and θ2.

In this embodiment, the third displacement pitch α3 is smaller than the second displacement pitch α2 (α2>α3) on the basis of the relation h2<h3 and a1=a2=a3. In other words, the third portion 13 has a small degree at which the sipe is inclined in the longitudinal direction with respect to the tire radial direction, in comparison with the second portion 11 ($\theta 1 > \theta 2 > \theta 3$).

In accordance with the matter mentioned above, in the sipe 7 of the present embodiment, the first displacement pitch $\alpha 1$, the second displacement pitch $\alpha 2$ and the third displacement pitch $\alpha 3$ satisfy the following relation (1).

$$\alpha 1 > \alpha 2 > \alpha 3 \quad (1)$$

In this case, the displacement pitches $\alpha 1$, $\alpha 2$ and $\alpha 3$ constitute an important parameter about an easiness of drawing the knife blade and the displacement of the sipe at the time of running. In other words, in the case that the displacement pitches $\alpha 1$, $\alpha 2$ and $\alpha 3$ are large, an engaging force between the opposing sipe side wall is increased. This increases an integral property of the opposing sipe side wall so as to maintain the block rigidity high even in the case that the shear force at the time of running is applied to the tread element. Accordingly, the block pieces 5P divided by the sipe are not collapsed significantly largely, and the edge of the sipe can be properly brought into contact with the road surface. On the contrary, in the case that the displacement pitches $\alpha 1$, $\alpha 2$ and $\alpha 3$ are small, the knife blade can be easily drawn off from the vulcanized tire. Further, in general, the sipe 7 is hard to be opened as the sipe is closer to the bottom 7e. In other words, this means that the drawing resistance of the knife blade is larger in the side of the bottom sipe 7e of the sipe after vulcanizing the sipe 7.

Taking the matters mentioned above into consideration, the sipe 7 in accordance with the present embodiment can lower the drawing resistance of the knife blade in the bottom side by making the displacement pitch smaller as the displacement portion is closer to the side of the bottom 7e. Accordingly, it is possible to solve the problem that the rubber chip and the dropout of the knife blade from the tire mold at the time of drawing off, and it is possible to improve the productivity. Further, as is apparent from FIG. 4, in the sipe 7, the amplitudes d1, d2 and d3 of the sipe surface measured in the perpendicular direction to the depth direction and the longitudinal direction of the sipe of the first portion 11, the second portion 12 and the third portion 13 are substantially the same, however, in the case that the lengths in the tire radial direction of the respective displacement portions 11 to 13 satisfy the relation h1<h2<h3, the slope becomes more gentle as being closer to the bottom 7e side of the sipe. Accordingly, the drawing property of the knife blade is improved.

Further, the first portion 11 having the open top end 7a which is in contact with the road surface particularly tends to be slid opposing sipe side walls in the sipe 7 due to the larger shear force at the time of running. Accordingly, in the sipe 7 in accordance with the present embodiment, the displacement pitch $\alpha$ is increased as the displacement portion is closer to the road surface. Therefore, the closer to the road surface the portion is, the more largely the engaging force between the sipe surfaces can be obtained at the time of running. Accordingly, since the block rigidity is not deteriorated, it is possible to inhibit the sipe from being excessively displaced, and it is possible to properly bring the sipe edge into contact with the road surface. In other words, it is possible to establish both the running property on the ice road and the formability.

As a particularly preferable aspect, it is desirable that the sipe 7 satisfies the following relations (2), (3) and (4).

$$0.3 < h1/h2 < 1.0 \quad (2)$$

$$0.5 < h2/h3 < 1.0 \quad (3)$$

$$h1/h2 < h2/h3 \quad (4)$$

In the case that the ratio (h1/h2) of the length h1 in the radial direction of the first portion 11 and the length h2 in the radial direction of the second portion 12 is equal to or less than 0.3, there is a tendency that the first portion 11 early disappears due to an abrasion, and the block rigidity is lowered. In the same manner, in the case that the ratio (h2/h3) of the length h2 in the radial direction of the second portion 13 is equal to or less than 0.5, there is a tendency that the sufficient block rigidity can not be obtained at a later stage of the abrasion. Further, it is apparent that it is possible to improve the drawing property of the knife blade by defining the ratio of the length in the tire radial direction of the respective displacement portions, that is, by increasing the ratio of the displacement portion having the small displacement pitch, as in the relation (4) mentioned above.

The sipe 7 in this embodiment is shown as the sipe constituted by three portions comprising the first portion 11, the second portion 12 and the third portion 13, however, it may be constituted by a sipe in which a fourth displacement portion, a fifth displacement portion and the like are further included in the inner side in the tire radial direction of the third portion 13. Further, as in the embodiment mentioned above, the sipe 7 may be provided with a non-portion extending in the tire radial direction without being displaced in the longitudinal direction in the inner side in the tire radial direction of the third portion 13 (not shown), in addition to being structured only by the displacement portion. The length in the radial direction of the sipe 7 is preferably defined in accordance with the customs.

Further, although not particularly limited, the first displacement pitch $\alpha 1$ is preferably equal to or more than 0.4, and more preferably equal to or more than 0.7. In the case that the first displacement pitch $\alpha 1$ is less than 0.4, the engaging force between the sipe surfaces is relatively lowered, and the block rigidity tends to be lowered. On the contrary, in the case that the displacement pitch $\alpha 1$ is too large, the drawing property of the knife blade is significantly deteriorated. Accordingly, the upper limit of the first displacement pitch $\alpha 1$ is preferably equal to or less than 1.2, and more preferably equal to or less than 1.0.

Further, the ratio ($\alpha 2/\alpha 1$) of the second displacement pitch $\alpha 2$ and the first displacement pitch $\alpha 1$ is preferably equal to or more than 0.3, and more preferably equal to or more than 0.5. In the case that the ratio ($\alpha 2/\alpha 1$) mentioned above is less than 0.3, there is a tendency that the degree of the slope becomes excessively small, and the engaging force between the sipe surfaces is lowered. On the contrary, in the case that the ratio ($\alpha 2/\alpha 1$) is too large, an effect of improving the drawing property of the knife blade tends to be lowered. Accordingly, the upper limit of the ratio ($\alpha 2/\alpha 1$) is preferably equal to or less than 0.9, and more preferably equal to or less than 0.8. Further, from the same view point, the ratio ($\alpha 3/\alpha 2$) of the second displacement pitch $\alpha 2$ and the third displacement pitch $\alpha 3$ is preferably equal to or more than 0.5, and more preferably equal to or more than 0.7, and the upper limit thereof is preferably equal to or less than 0.9, and more preferably equal to or less than 0.8.

Figure 6:
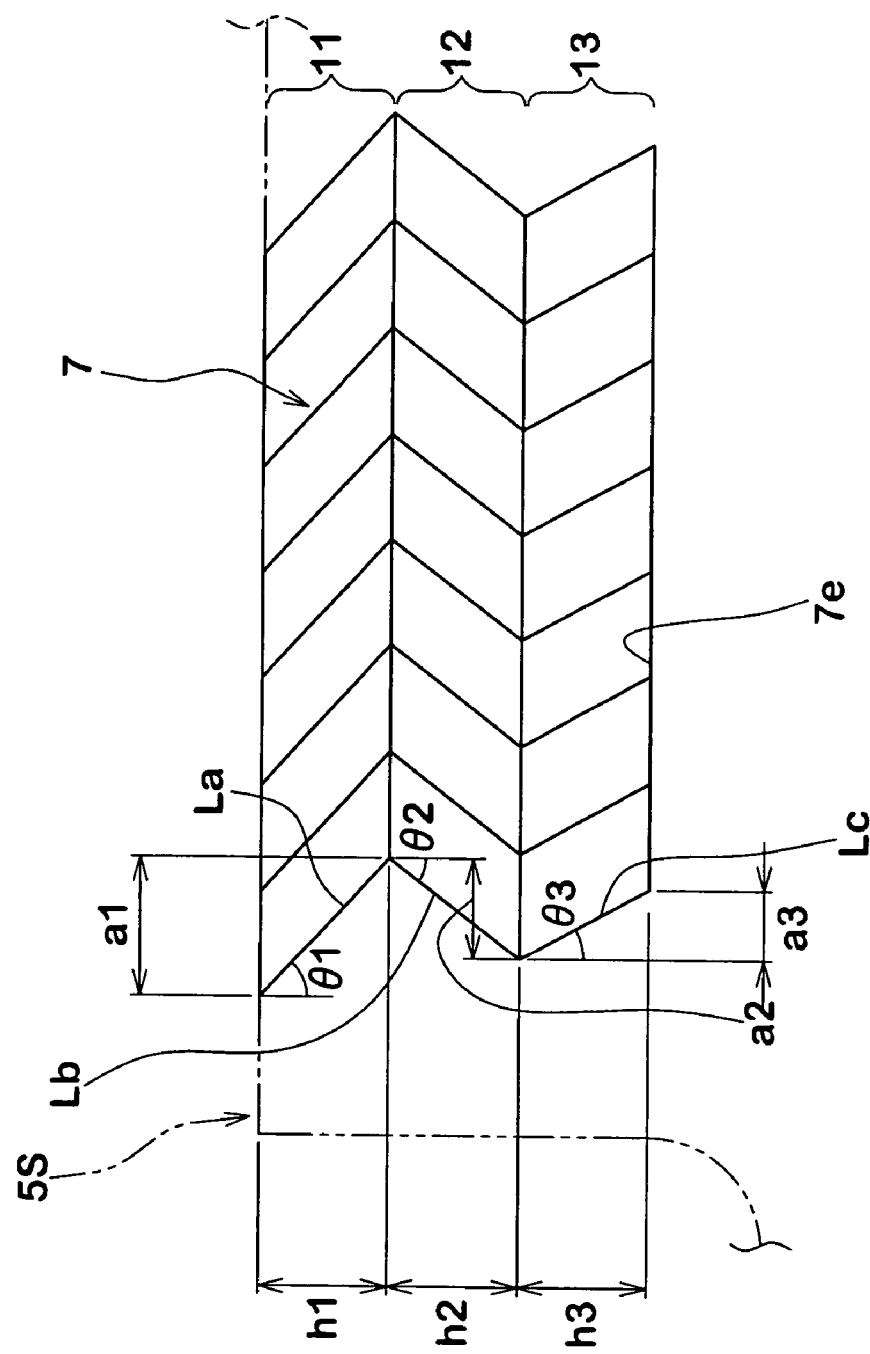
FIG. 6 is a cross sectional view at a position corresponding to FIG. 3, showing another embodiment of the present invention.

FIG. 6 shows another embodiment in accordance with the present invention. The sipe 7 in accordance with the embodiment is structured such that the respective lengths h1, h2 and h3 in the tire radial direction of the first portion 11, the second portion 12 and the third portion 13 are substantially equal to each other (h1=h2=h3). In this case, since the first, second and third displacement pitches $\alpha 1$, $\alpha 2$ and $\alpha 3$ satisfy the relation (1) mentioned above, the respective displacement lengths a1, a2 and a3 of the first, second and third portions 11, 12 and 13 satisfy the following relation (5).

$$a1 > a2 > a3 \quad (5)$$

Also in this embodiment, the sipe 7 can satisfy the drawing property of the knife blade and the edge effect on the ice road at a high level.

Figure 7:
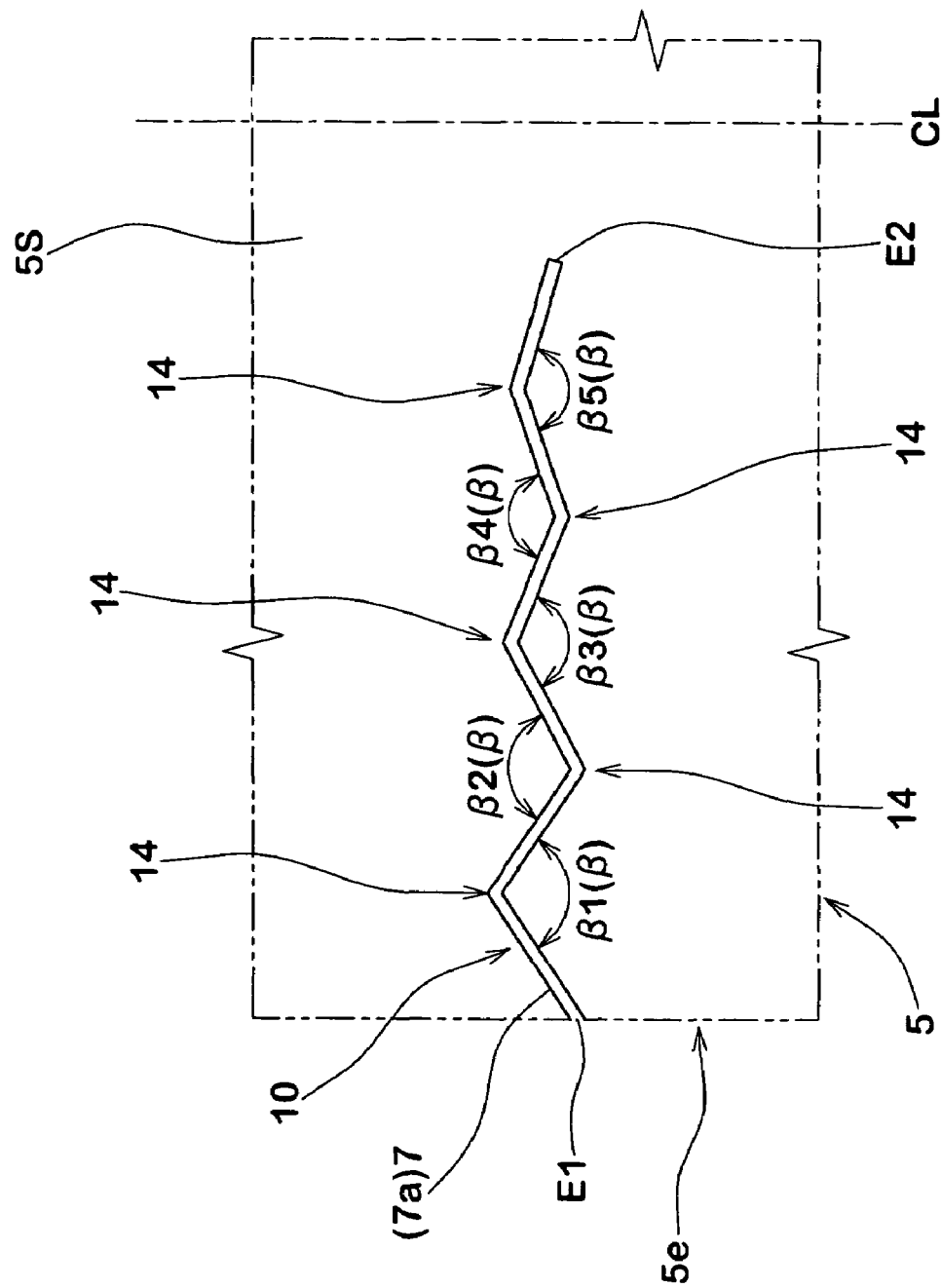
FIG. 7 is a view at a position corresponding to FIG. 2, showing another embodiment of the present invention.

FIG. 7 shows the open top end 10 of the sipe 7, as an embodiment in accordance with the present invention. The sipe 7 has one end E1 open to a side surface 5e of the block 5. The other end E2 of the sipe 7 exists in the inner portion of the block 5. Further, reference symbol CL in FIG. 7 denotes a center line of the block dividing the block 5 into two sections in a width direction thereof. The zigzag part 7a of the sipe 7 includes a plurality of zigzag corners 14. In this embodiment, a narrow angle β of the zigzag corner 14 is larger as the zigzag corner 14 is closer to the center in the block width direction (that is, the width center line CL).

The sipe 7 in accordance with the previous embodiment is shown as the sipe having the zigzag part 7a extending in the longitudinal direction at the same pitch Y as the zigzag amplitude S, however, in this embodiment, the shape of the zigzag part is changed in the longitudinal direction. The sipe 7 tends to be open in the side of the side surface 5e of the block 5 comparatively, however, the opening tendency is deteriorated as being closer to the width center line CL of the block 5. Accordingly, the knife blade is hard to be drawn as being closer to the width center line CL of the block 5. In this embodiment, the narrow angle β of the zigzag corner is made larger as being closer to the center in the block width direction. In other words, in the case that the narrow angle β of the zigzag corner is set to β1, β2, β3, ... βn (n is the closest narrow angle to the center line CL) in sequential order from the zigzag corner apart from the center line CL of the block, in FIG. 7, it is desirable to satisfy the relation β1≦β2≦β3≦β4≦βn (=β5) and β1<βn (=β5). In particular, it is desirable to satisfy the relation β1<β2<β3<β4<βn (β5).

The drawing property of the knife blade is further improved by employing the structure mentioned above. In this case, if the narrow angle β is too large, there is a tendency that the engaging force between the sipe surfaces is lowered. Accordingly, the largest narrow angle β is preferably 90 to 130 degree, and more preferably 100 to 120 degree.

In the embodiment mentioned above, there is shown the structure in which the tread element is constituted by the block, however, the tread element of course includes the rib continuously extending in the tire circumferential direction.

EXAMPLES

Figure 8A:
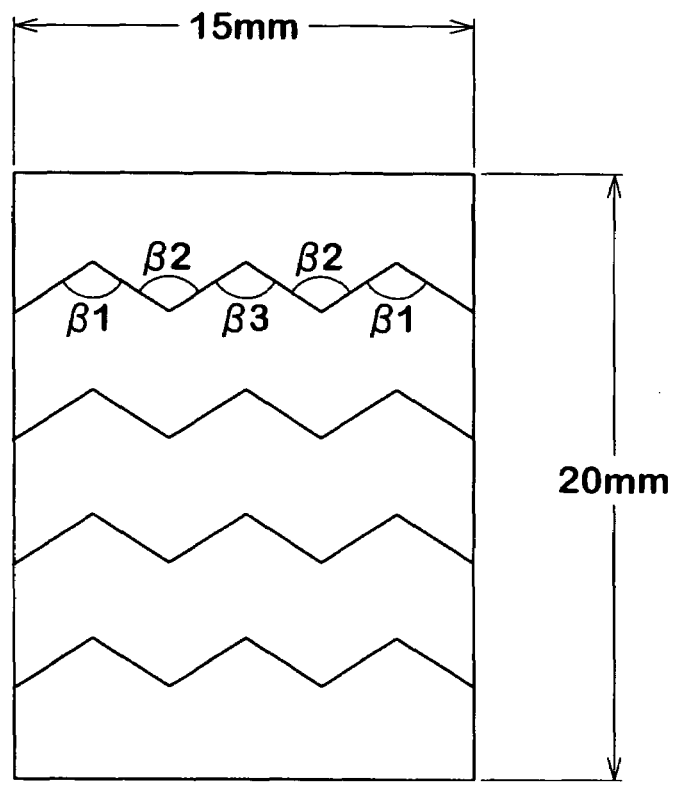
FIG. 8A is a plan view of a rubber block in accordance with the embodiment and a comparative embodiment.

As shown in FIG. 8A, there is produced a block model in which four sipes (having a common depth 9.0 mm and detailed specification in Table 1) are formed at regular intervals in a rectangular rubber block (width in a tire axial direction: 15 mm, length in a tire circumferential direction: 20 mm, height: 10 mm). Then, various tests are conduced thereto. Testing methods are as follows.

<Block Rigidity Test>

Figure 8B:
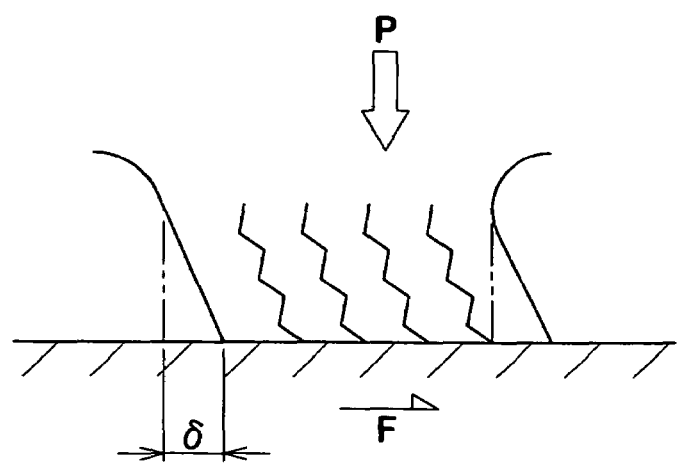
FIG. 8B is a side view explaining a block rigidity test.

As shown in FIG. 8B, the block model is pushed to the flat surface by applying a vertical load P=269 kPa, and a shear force F is applied such that a shear deformation amount δ of the block model becomes 3 mm. The rigidity of the block model is estimated on the basis of the magnitude of the shear force F at this time. Results are expressed by an index obtained by setting the shear force of Comparative Example 1 to 100. The larger the numerical value is, the better the rigidity is.

<Knife Blade Drawing Property Test>

The rubber block is vulcanized by using the knife blade, and thereafter, the force required for drawing off the knife blade vertically is measured. Results are expressed by an index obtained by setting Comparative Example 1 to 100. The smaller the numerical value is, the better the property is.

Results of the test are shown in Table 1.

TABLE 1

| | | Comparative Example 1 | Comparative Example 2 | Example 1 | Example 2 | Example 3 | Example 4 |
|---|---|---|---|---|---|---|---|
| Displacement length | Displacement length a1 of first portion [mm] | 1.4 | 1.4 | 1.4 | 1.4 | 1.9 | 1.9 |
| | Displacement length a2 of second portion [mm] | 1.4 | 1.4 | 1.4 | 1.4 | 1.6 | 1.6 |
| | Displacement length a3 of third portion [mm] | 1.4 | 1.4 | 1.4 | 1.4 | 0.9 | 0.9 |
| Length in radial direction | Length h1 in tire radial direction of first portion [mm] | 3 | 5 | 1 | 2 | 3 | 2 |
| | Length h2 in tire radial direction of second portion [mm] | 3 | 3 | 3 | 3 | 3 | 3 |
| | Length h3 in tire radial direction of third portion [mm] | 3 | 1 | 5 | 4 | 3 | 4 |
| Displacement pitch | $\alpha_1$ (=a1/h1) | 0.47 | 0.28 | 1.4 | 0.70 | 0.63 | 0.95 |
| | $\alpha_2$ (=a2/h2) | 0.47 | 0.47 | 0.47 | 0.47 | 0.53 | 0.53 |
| | $\alpha_3$ (=a3/h3) | 0.47 | 1.4 | 0.28 | 0.35 | 0.30 | 0.23 |
| h1/h2 | | 1.0 | 1.67 | 0.33 | 0.67 | 1.0 | 0.67 |
| h2/h3 | | 1.0 | 3.00 | 0.60 | 0.75 | 1.0 | 0.75 |
| Zigzag corner angle β | | Constant | Constant | Constant | Constant | Constant | Constant |
| Test result | Block rigidity (index) | 100 | 85 | 100 | 101 | 110 | 109 |
| | Drawing property of knife blade (index) | 100 | 158 | 76 | 76 | 95 | 87 |

As a result of the test, in all the structures in accordance with the Examples, the block rigidity is high and the drawing property of the knife blade is well, so that an advantage of the effect of the present invention is confirmed.

What is claimed is:

1. A pneumatic tire comprising a tread portion having tread elements each provided with a sipe, wherein the sipe is open to a upper surface of the tread element, and has an open top end including a zigzag part and a bottom in an inner side in a radial direction of the tire, wherein the sipe comprises:
   a first portion in which the zigzag part of the open top end extends to a side of the bottom in a state of being inclined to one side of a longitudinal direction of the sipe;
   a second portion connected to an inner side in a radial direction of the first portion, and in which the zigzag part extends to the side of the bottom in a state of being inclined in an opposite direction to the first portion; and
   a third portion connected to an inner side in a radial direction of the second portion, and in which the zigzag part extends to the side of the bottom in a state of being inclined in an opposite direction to the second portion,
   the zigzag part extends from the open top to the bottom while substantially keeping its zigzag shape including an amplitude and a pitch, and
   the sipe satisfies the following relation (1):

$$\alpha 1 > \alpha 2 > \alpha 3 \qquad (1)$$

where $\alpha 1$ is a ratio (a1/h1) between a displacement length a1 of the first portion along the longitudinal direction of the sipe and a length h1 in a radial direction of the first portion, $\alpha 2$ is a ratio (a2/h2) between a displacement length a2 of the second portion along the longitudinal direction of the sipe and a length h2 in a radial direction of the second portion, and $\alpha 3$ is a ratio (a3/h3) between a displacement length a3 of the third portion along the longitudinal direction of the sipe and a length h3 in a radial direction of the third portion, and wherein
   the first portion inclines at an angle $\theta 1$ with respect to a tire-radial line when viewing from the front of the sipe surface,
   the second portion inclines at an angle $\theta 2$ being opposed to the angle $\theta 1$ with respect to the tire-radial line when viewing from the front of the sipe surface,
   the third portion inclines at an angle $\theta 3$ being opposed to the angle $\theta 2$ with respect to the tire-radial line when viewing from the front of the sipe surface, and
   the sipe satisfies the following relation:

$$\theta 1 > \theta 2 > \theta 3.$$

2. The pneumatic tire according to claim 1, wherein the respective displacement lengths a1, a2 and a3 of the first portion, the second portion and the third portion are substantially the same.

3. The pneumatic tire according to claim 1 or 2, wherein the sipe satisfies the following relations (2), (3) and (4):

$$0.3 < h1/h2 < 1.0 \qquad (2)$$

$$0.5 < h2/h3 < 1.0 \qquad (3)$$

$$h1/h2 < h2/h3 \qquad (4).$$

4. The pneumatic tire according to claim 1 wherein the respective radial lengths h1, h2 and h3 of the first portion, the second portion and the third portion are substantially the same.

5. The pneumatic tire according to claim 1 wherein
   the zigzag part of the sipe includes a plurality of zigzag corners, and
   a narrow angle $\beta$ of the zigzag corner is increased as the zigzag corner is closer to a center in the tread element width direction.

6. The pneumatic tire according to claim 1 wherein the ratio (a1/h1) is in a range of from 0.4 to 1.2.

7. The pneumatic tire according to claim 1 wherein a ratio ($\alpha 2/\alpha 1$) is in a range of from 0.3 to 0.9.

8. The pneumatic tire according to claim 1 wherein a ratio ($\alpha 3/\alpha 2$) is in a range of from 0.5 to 0.9.

9. A pneumatic tire comprising a tread portion having tread elements each provided with a sipe, wherein the sipe is open to an upper surface of the tread element, and has an open top end including a zigzag part and a bottom in an inner side in a radial direction of the tire, wherein the sipe comprises:
   a first portion in which the zigzag part of the open top end extends to a side of the bottom in a state of being inclined to one side of a longitudinal direction of the sipe;
   a second portion connected to an inner side in a radial direction of the first portion, and in which the zigzag part extends to the side of the bottom in a state of being inclined in an opposite direction to the first portion; and
   a third portion connected to an inner side in a radial direction of the second portion, and in which the zigzag part extends to the side of the bottom in a state of being inclined in an opposite direction to the second portion,
   the zigzag part extends from the open top to the bottom while substantially keeping its zigzag shape including an amplitude and a pitch,
   the sipe satisfies the following relation (1):

$$\alpha 1 > \alpha 2 > \alpha 3 \qquad (1)$$

where $\alpha 1$ is a ratio (a1/h1) between a displacement length a1 of the first portion along the longitudinal direction of the sipe and a length h1 in a radial direction of the first portion, $\alpha 2$ is a ratio (a2/h2) between a displacement length a2 of the second portion along the longitudinal direction of the sipe and a length h2 in a radial direction of the second portion, and $\alpha 3$ is a ratio (a3/h3) between a displacement length a3 of the third portion along the longitudinal direction of the sipe and a length h3 in a radial direction of the third portion, and
   amplitudes d1, d2 and d3 of a sipe surface measured in a perpendicular direction to the radial direction and a longitudinal direction of the first portion, the second portion and the third portion are substantially the same, and wherein
   the first portion inclines at an angle $\theta 1$ with respect to a tire-radial line when viewing from the front of the sipe surface,
   the second portion inclines at an angle $\theta 2$ being opposed to the angle $\theta 1$ with respect to the tire-radial line when viewing from the front of the sipe surface,
   the third portion inclines at an angle $\theta 3$ being opposed to the angle $\theta 2$ with respect to the tire-radial line when viewing from the front of the sipe surface, and
   the sipe satisfies the following relation:

$$\theta 1 > \theta 2 > \theta 3.$$

10. The pneumatic tire according to claim 9 wherein the respective displacement lengths a1, a2 and a3 of the first portion, the second portion and the third portion are substantially the same.

11. The pneumatic tire according to claim 9 wherein the respective radial lengths h1, h2 and h3 of the first portion, the second portion and the third portion are substantially the same.

12. The pneumatic tire according to claim 9 wherein
the zigzag part of the sipe includes a plurality of zigzag corners, and
a narrow angle β of the zigzag corner is increased as the zigzag corner is closer to a center in the tread element width direction.

13. A pneumatic tire comprising a tread portion having tread elements each provided with a sipe, wherein the sipe is open to a upper surface of the tread element, and has an open top end including a zigzag part and a bottom in an inner side in a radial direction of the tire, wherein the sipe comprises:
   a first portion in which the zigzag part of the open top end extends to a side of the bottom in a state of being inclined to one side of a longitudinal direction of the sipe;
   a second portion connected to an inner side in a radial direction of the first portion, and in which the zigzag part extends to the side of the bottom in a state of being inclined in an opposite direction to the first portion; and
   a third portion connected to an inner side in a radial direction of the second portion, and in which the zigzag part extends to the side of the bottom in a state of being inclined in an opposite direction to the second portion, and the sipe satisfies the following relation (1):

$$\alpha 1 > \alpha 2 > \alpha 3 \qquad (1)$$

where α1 is a ratio (a1/h1) between a displacement length a1 of the first portion along the longitudinal direction of the sipe and a length h1 in a radial direction of the first portion, α2 is a ratio (a2/h2) between a displacement length a2 of the second portion along the longitudinal direction of the sipe and a length h2 in a radial direction of the second portion, and α3 is a ratio (a3/h3) between a displacement length a3 of the third portion along the longitudinal direction of the sipe and a length h3 in a radial direction of the third portion, and wherein the respective radial lengths h1, h2 and h3 of the first portion, the second portion and the third portion are substantially the same.

14. The pneumatic tire according to claim 13 wherein the zigzag part of the sipe includes a plurality of zigzag corners, and a narrow angle β of the zigzag corner is increased as the zigzag corner is closer to a center in the tread element width direction.

* * * * *